United States Patent [19]

Matsui et al.

[11] Patent Number: 5,439,778
[45] Date of Patent: Aug. 8, 1995

[54] REFLECTANCE CONTROL METHOD AND OPTICAL RECORDING MEDIUM HAVING CONTROLLED REFLECTANCE

[75] Inventors: Fumio Matsui; Kumi Kawano, both of Tsurugashima, Japan

[73] Assignee: Pioneer Electronic Corporation, Tokyo, Japan

[21] Appl. No.: 242,007

[22] Filed: May 12, 1994

[30] Foreign Application Priority Data

May 17, 1993 [JP] Japan .................................. 5-114371

[51] Int. Cl.⁶ .......................... G03C 7/26; G03C 7/24
[52] U.S. Cl. ................... 430/270; 430/945; 427/164
[58] Field of Search ............. 430/270, 945, 495, 321; 427/164

[56] References Cited

U.S. PATENT DOCUMENTS

| | | | |
|---|---|---|---|
| 4,513,071 | 4/1985 | Mey | 430/19 |
| 4,816,386 | 3/1989 | Gotoh et al. | 430/495 |
| 4,845,021 | 7/1989 | Miyazaki et al. | 430/495 |

FOREIGN PATENT DOCUMENTS 59-223957 12/1984 Japan .

Primary Examiner—Charles L. Bowers, Jr.
Assistant Examiner—John A. McPherson
Attorney, Agent, or Firm—Young & Thompson

[57] ABSTRACT

A reflectance of an optical recording medium provided with a light transmission substrate on which a recording film containing a dye material is formed is controlled or regulated by providing a recording film which is formed by a method comprising the steps of preparing a solution containing only a non-aggregated portion of a dye material and a solution containing only an aggregated portion of a dye material, mixing both the solutions with a predetermined mixing ratio to prepare a mixture solution and coating the mixture solution on a surface of a light transmission substrate to form a recording film of an optical recording medium having a predetermined reflectance by changing the mixing ratio. The aggregated portion of the dye material is a metal phthalocyanine aggregated material represented.

7 Claims, 2 Drawing Sheets

REFLECTANCE CONTROL METHOD AND OPTICAL RECORDING MEDIUM HAVING CONTROLLED REFLECTANCE

BACKGROUND OF THE INVENTION

The present invention relates to a reflectance control method, for example, for controlling a reflectance of an optical recording medium and also relates to an optical recording medium having controlled reflectance.

An optical recording medium has been widely developed and utilized for the reason that the optical recording medium generally has a large memory capacitance and write-in or read-out operation can be performed in non-contact state, thus being advantageous for use.

A typical example of such optical recording medium is an optical disk, and there has been a tendency to standardize optical disks to standardize optical characteristics, mechanical characteristics and other characteristics thereof. For example, a reflectance or reflectance ratio, as one of the optical characteristics of a recording film of the optical recording medium is standardized to be within 10-90% before recording and 27-90% after recording, and the uniformity of the reflectance is also standardized to be less than ±12%.

Then, in a conventional technique for controlling the reflectance of optical recording media to accord with the predetermined standardized values, recording films are each formed by mixing different kinds of materials or a film thickness thereof is changed to control the reflectance.

However, such conventional technique for controlling the reflectance involves the following problems.

That is, first, in a reflectance control method in which a recording film is formed by a mixture of different kinds of materials, there is a case where the different materials are mutually internally reacted. In such case, it is impossible to mix the materials or it is necessary to control the reflectance in consideration of the internal reaction of the materials, thus being difficult to precisely control the reflectance.

Next, in a reflectance control method in which a thickness of the recording film is changed, it is difficult to uniformly the recording film so as to have a uniform thickness through an entire surface of the optical recording medium, thus making it also difficult to precisely control the reflectance.

In the above meanings, in the known art, there is not provided with an optical recording medium having an easily controllable or adjustable reflectance.

SUMMARY OF THE INVENTION

An object of the present invention is to substantially eliminate the defects or problems encountered in the prior art as described above and to provide a reflectance control method for an optical recording medium capable of easily performing the reflectance control of an optical recording medium having a recording film formed by different kinds of materials without considering an internal reaction between the different kinds of materials and also provide an optical recording medium having a controlled reflectance.

This and other objects of the present invention can be achieved according to the present invention by providing, in one aspect, a method of controlling or regulating a reflectance of an optical recording medium provided with a light transmission substrate on which a recording film containing a dye material is formed, comprising the steps of:

preparing a solution containing only a non-aggregated portion of a dye material and a solution containing only an aggregated portion of a dye material;

mixing both the solutions with a predetermined mixing ratio to prepare a mixture solution; and coating the mixture solution on a surface of a light transmission substrate to form a recording film of an optical recording medium having a predetermined reflectance.

In another aspect, there is provided an optical recording medium having a controlled reflectance comprising:

a light transmission substrate; and a recording film formed on the light transmission substrate, the recording film being formed of a dye material containing an aggregated portion and a non-aggregated portion having a predetermined mixing ratio.

The recording film is prepared by coating a mixture solution, which is prepared by mixing a solution containing only a non-aggregated portion of a dye material and a solution containing only an aggregated portion of a dye material, with a predetermined mixing ratio, on a surface of the light transmission substrate.

In the present invention, the term of "aggregation" in relation to the aggregated portion or non-aggregated portion is used to teach a meaning that a plurality of, such as about 2-10, molecules of the same substance are coupled, i.e. aggregated, with each other and behave as if they provide a single molecule, and when, for example, two molecules are aggregated together by hydrogen bonding of other force between molecules, a dimer is formed.

In a preferred embodiment, the aggregated portion of the dye material is formed of a metalphthalocyanine aggregated material represented by a following formula (1)

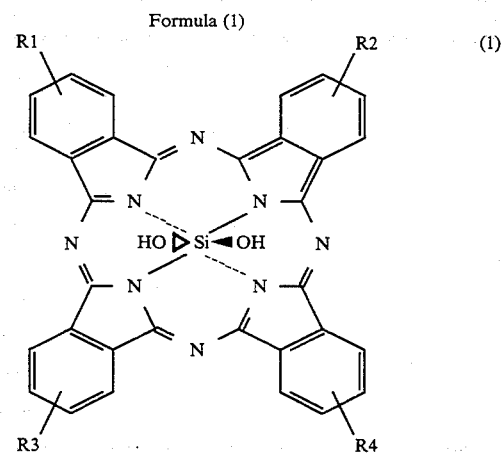

Formula (1)

wherein R1, R2, R3 and R4 are each independently selected from the group consisting of a hydrogen atom, a liner alkyl group of carbon number 12-21, $SO_2NH-(CH_2)_3-N-(C_2H_5)_2$, or $SO_2NH-(CH_2)_3-N-(CH_3)_2$ and $O-(CH_2)_{19}-OH$.

The solution only containing the aggregated portion of the dye material is prepared by applying an energy to the solution only containing the non-aggregated portion. The energy applied to the solution only containing the non-aggregated portion is a heat energy or an optical energy. Furthermore, a heat circulation method or protonation method for controlling pH value will be also considered.

The aggregated portion will be prepared by dissolving or dispersing the dye material originally of a non-aggregated portion into a suitable solvent to obtain a solution and, then, heating the solution at a temperature near the boiling point, whereby molecules in an aggregated state are formed in the solvent as aggregated portion.

According to the present invention, the reflectance of an optical recording medium is regulated or controlled by changing the mixing ratio between the aggregated portion thus formed and the non-aggregated portion of the dye material. The mixing ratio is not specifically limited, and a case of only the aggregated portion of the dye material or a case of only the non-aggregated portion thereof will be included in the present invention.

In order to change the mixing ratio between the aggregated portion and the non-aggregated portion of the dye material, a solvent including the dye material is fully heated to change all the dye material contained in the solvent to the aggregated portion. Then, the amount of the aggregated portion included in the solvent may be regulated or controlled by changing the mixing ratio between a solvent, of a predetermined density, including only the thus prepared aggregated portion and a solvent, of a predetermined density, including only the non-aggregated portion.

There will be proposed various kinds of known solvents for dissolving the dye material, such as tetrafluoropropanol, methanol, isophoron, 2-ethoxyethanol, 2-methoxyethanol, diacetonealcohol, cyclohexanol, 1,2-dichloroethane, toluene, or xylene.

In the present invention, the solvent, in which the mixing ratio of the aggregated portion and the non-aggregated portion is adjusted, is coated on a recording film of an optical recording medium and thereafter dryed. The reflectance can be thus controlled by the recording film containing the aggregated portion and the non-aggregated portion of the dye material in a desired mixing ratio.

The natures and further features of the present invention will be made more clear from the following descriptions of a preferred embodiment made in conjunction with the accompanying drawings.

DESCRIPTION OF THE PREFERRED EMBODIMENT

Figure 1:
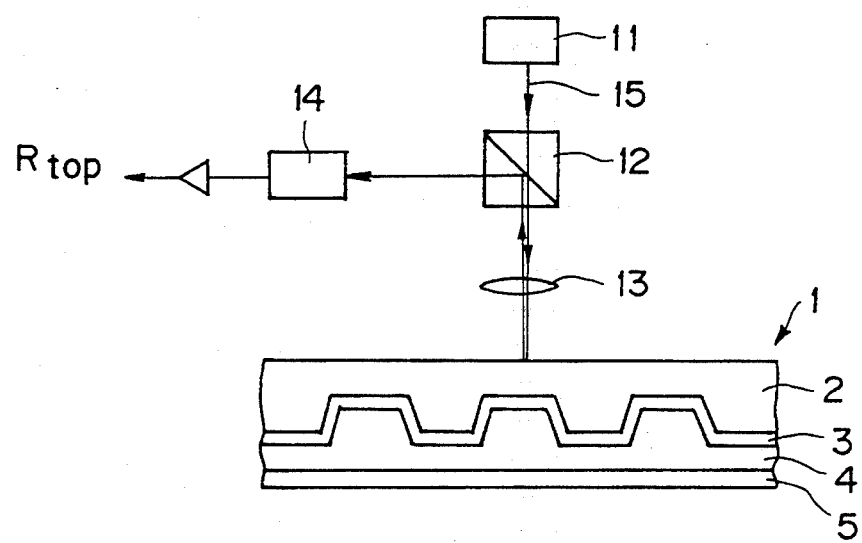
FIG. 1 is a brief diagram explaining the reflectance measuring method for carrying out the present invention.

The present invention will be described in more detail hereunder through a preferred embodiment. In the following embodiment, the reflectance control method according to the present invention is applied for controlling of reflectance of a recording film of an optical recording medium.

An optical recording medium provided with at least a light transmission substrate and a recording film may be utilized for the present embodiment. That is, a structure in which a recording film is formed on a light transmission substrate, so-called a single layer structure, or a structure in which a reflection film and/or protection film are also formed, so-called a multi-layer structure, on the recording film formed on the substrate, may be used.

In general, the light transmission substrate is formed in a disk shape having one flat surface on which pre-pit or pre-groove for tracking is formed in spiral shape or pre-pits or pre-grooves are formed in concentric shape. As a substrate having such pre-pit or pre-groove, there will be provided a resin substrate integrally produced, through an injection molding process, from a transparent material such as polycarbonate (PC) resin, polymethacrylic methyl acid (PMMA) resin or amorphas polyolefin (APO) resin. A substrate formed by a so-called 2P (photopolymerization) method may be utilized other than the integrally formed resin substrate through the injection molding. The substrate formed by such material generally has a thickness of 1.0 to 1.5 mm.

According to the embodiment, the recording film formed on the substrate includes an aggregated portion and a non-aggregated portion of a dye material in a predetermined ratio. As such dye material, there is provided a metal phthalocyanine as one of organic dyes represented by the general formula (1) mentioned hereinbefore.

A recording film formed on a substrate including aggregated and non-aggregated portions of a dye material in a predetermined mixing ratio is formed by a known coating method such as spin-coat method for coating a solvent containing aggregated and non-aggregated portions of a dye material in a predetermined ratio on the substrate. The recording film thus formed usually has a thickness of about 10–1000 nm.

A reflection film which may be formed on the recording film is formed of a metal such as Au, Al, Ag or Cu through a vacuum evaporation method, a spattering method or an ion plating method.

A protection film which may be further formed on the reflection film is generally formed by first coating ultraviolet setting resin through the spin coat method and then irradiating ultraviolet ray to harden the coated resin film. An epoxy resin, an acrylic resin, a silicone resin or urethane resin may be used for the material of the protection film.

That is, the optical recording medium has the structure in which the recording film is formed on the substrate, and the reflection film and then the protection film are formed on one surface of the recording film, and the recording film includes the aggregated Portion and the non-aggregated portion of the dye material in a predetermined ratio, so that the surface reflectance of the optical recording medium before recording on the recording film can be regulated or adjusted to a predetermined or desired value.

Upon the recording on the recording film of the optical recording medium, the non-aggregated portion of the dye material contained in the recording film is denatured to the aggregated portion by the irradiation of laser beam to form a recording portion. That is, there causes a difference in the reflectance or light transmission ratio between the recording portion in which the ratio of the aggregated portion is increased through the laser irradiation and the non-recording portion in which the ratio of the aggregated material is not increased, and such difference makes it possible to reproduce a recorded information.

The present invention will be made more clear through the following experiments carried out by the inventor.

PREPARATION OF OPTICAL RECORDING MEDIUM

Metal phthalocyanine represented by the following formula (2) was heated and circulated in toluene for 12-24 hours to form an aggregated portion, and a powder material, i.e. aggregated portion, obtained by removing the toluene was then dissolved in tetrafluoropropanol, thereby obtaining a solvent of a predetermined density containing only the aggregated portion.

In the next step, the thus prepared solvent of a predetermined density containing only the aggregated material was mixed with a solvent of a predetermined density including only the non-aggregated portion, which was prepared separately, and the mixing ratio was changed to adjust, such shown in the following table 1, the containing ratio between the aggregated material and the non-aggregated portion in the mixed solvent.

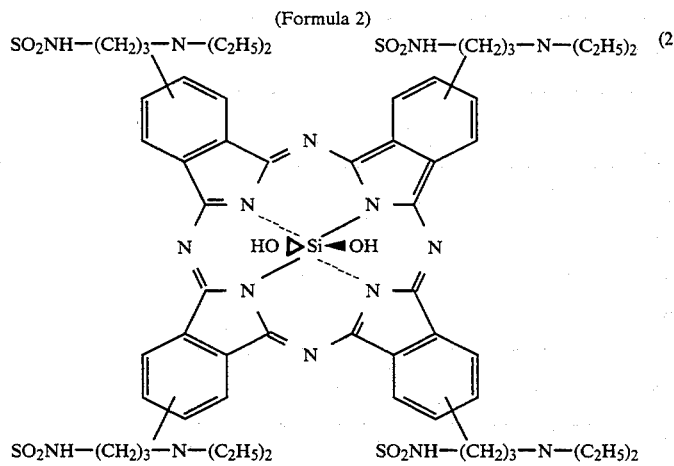

(Formula 2)

The thus adjusted solvent containing the aggregated portion and the non-aggregated portion in a predetermined ratio was coated through a spin coat method on a polycarbonate substrate (diameter: 130 mm, thickness: 1.2 mm, provided with single spiral groove, TP=1.6 μm, peak width at half height: 0.4-0.6 μm, groove depth: 600-800 Å) formed by an injection molding method so as to have a thickness of about 600-2000 Å, thus forming a recording film.

In a subsequent step, as shown in FIG. 1, a reflection film 4 formed of an Au material was formed on the recording film 3 formed on the substrate 2 in the former step so as to provide a thickness of about 1000 Å, and a protection film 5 formed of an ultraviolet setting resin was further formed on the reflection film 4 so as to provide a thickness of about 3 μm. Through the above steps, various kinds of the optical recording media each provided with the reflection film and the protection film was prepared.

REFLECTANCE MEASUREMENT

The reflectance of the respective recording media thus formed were measured by a reflectance measuring system of FIG. 1.

The reflectance measuring system of FIG. 1 comprises a laser oscillator 11, a half mirror 12, a laser converging lens 13 and a detector 14. The laser beam 15 generated from the laser oscillator 11 passes the half mirror 12 and then the laser converging lens 13 and is projected on the surface, on which the reflection film 4 and the protection film 5 are not formed, of the recording film 3 of the optical recording medium 1. The laser beam 15 is reflected on that surface of the recording film 3 and again passes the converging lens 13 and the half mirror 12. The laser beam 15 is then projected into the detector 14 in which an intensity of the reflected laser beam is measured and detected.

The intensities, that is, detected powers ($R_{top}$) of the reflected laser beams on the surface of the optical recording medium 1 were converted into values of reflectance, i.e. reflection ratios, (%R). This conversion was carried out by utilizing a test disk, produced by Philips Corporation (Philips Test Disk 5), having a known reflectance (%R=74%). This Philips Test Disk 5 was utilized for the reflectance measuring system of FIG. 1 and obtained the detected power of the reflected light ($R_{top}$=758 mW). According to the thus obtained data of the test disk, the conversion with respect to the respective optical recording media prepared in the above described manner was performed, and the results are shown in the following table 1.

TABLE 1

| | Mixing Ratio (non-aggregated portion: aggregated portion) | Detected Power ($R_{top}$) | Reflectance (% R) |
| --- | --- | --- | --- |
| Example 1 | 1:3 | 382 | 37.3 |
| Example 2 | 3:1 | 420 | 41.0 |
| Example 3 | 1:1 | 440 | 43.0 |
| Example 2 | 0:1 | 497 | 48.5 |

CONSIDERATION OF RESULTS

As is apparent from the above Table 1, according to the reflectance control method of the present invention, the reflectance of a light with respect to the optical recording medium can be easily arranged and controlled by changing the mixing ratio of the aggregated portion and the non-aggregated portion of the dye material forming the recording film, thus freely selecting the level of the reflectance.

ANALYSIS

The recording film constituting the optical recording medium as the test disk was separated by a high speed liquid chromatography (HPLC) and a gas chromatography [thermo-conductance type detector (TCD)-GC] to obtain two components, which correspond to the aggregated portion and the non-aggregated portion of the recording film.

Figure 2:
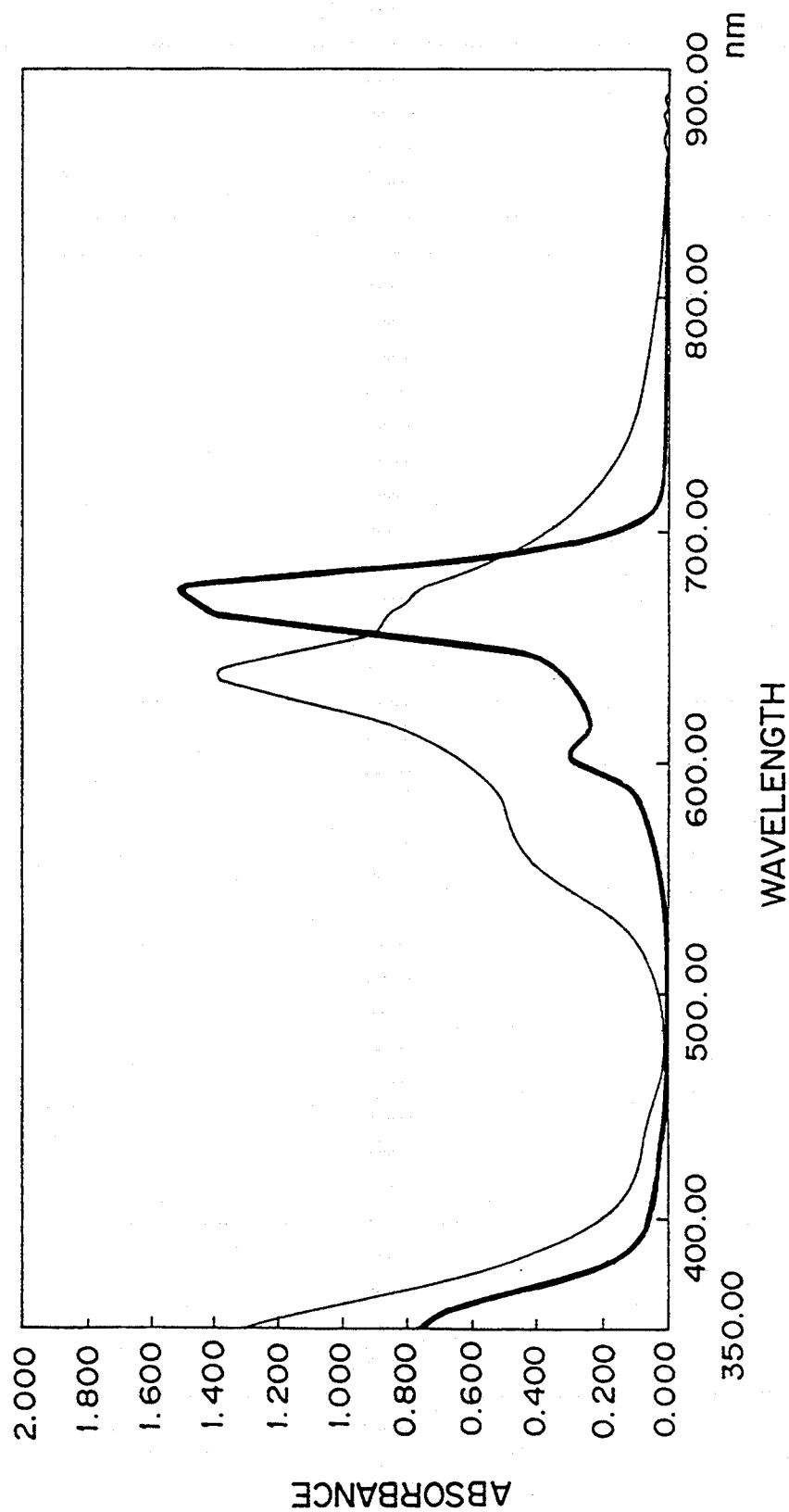
FIG. 2 is a graph representing spectral characteristics of an aggregated portion and a non-aggregated portion of a dye material in a recording film forming an optical recording medium.

The thus separated two components were diluted by TFP(tetrafluoropropanol) and spectral characteristics thereof were measured. The measured results are shown in FIG. 2, in which a thick line represents the spectral characteristic of the aggregated portion and a thin line represents that of the non-aggregated portion. It will be seen from the graph of FIG. 2 that absorption of light of the main peak is shifted to a short wavelength side to narrow a distance between the main peaks.

Both the spectral characteristics have clear difference, from which it will be understood that the dye material constituting the recording film of the optical recording medium is essentially composed of dimerized aggregated portion and non-aggregated portion, as the known study such as described in "The Phthalocyanines" (Frank H. Moser and Arther L. Thomas, published from CRC publishing firm in U.S.A., Vol 1, page 61, FIG. 1). However, it cannot be absolutely said that this aggregated portion is composed only of a dimer and it is considered that the aggregated portion will include more than a dimer.

Further, the aggregated portion and the non-aggregated portion were subjected to NMR (nuclear magnetic resonance) analysis.

As this result, a chemical structure is not changed from the fact that both the peak portions are mated with each other. That is, a chemical change such as polymerization is not caused at the above dimerization and shows that mere a aggregated condition is caused.

As described hereinbefore, according to the present invention, the reflectance of the optical recording medium can be easily adjusted or controlled by changing the mixing ratio of the aggregated portion and the non-aggregated portion forming the recording film. Therefore, it is not necessary to consider an internal reaction of the different kinds of materials which are to be mixed.

The reflectance control method according to the present invention will be applied to, other than the formation of the recording film of the optical recording medium, the formation of an enhance film or the like, and furthermore, will be utilized for a reflectance control of an organic fluorescent layer or an optical element such as color filter.

What is claimed is:

1. A method of controlling a reflectance of an optical recording medium provided with a light transmission substrate on which a recording film containing a dye material is formed, comprising the steps of:
   preparing a solution containing only a non-aggregated portion of a dye material and a solution containing only an aggregated portion of a dye material;
   mixing both the solutions with a predetermined mixing ratio to prepare a mixture solution; and
   coating the mixture solution on a surface of a light transmission substrate to form a recording film of an optical recording medium having a predetermined reflectance.

2. A method according to claim 1, wherein the aggregated portion of the dye material is formed of a metal phthalocyanine aggregated material represented by a following formula (1)

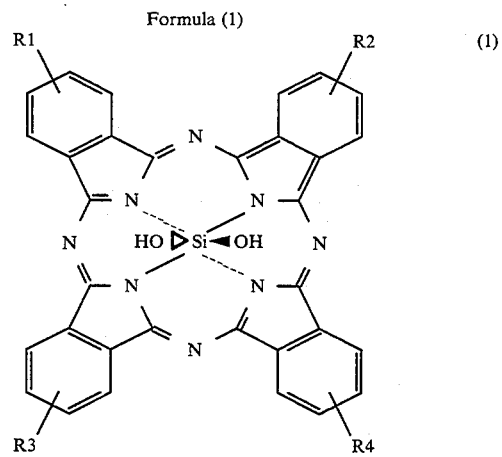

Formula (1)

wherein R1, R2, R3 and R4 are each independently selected from the group consisting of: a hydrogen atom, a liner alkyl group of carbon number 12-21, $SO_2NH-(CH_2)_3-N-(C_2H_5)_2$, $SO_2NH-(CH_2)_3-N-(CH_3)_2$ and $O-(CH_2)_{19}OH$.

3. A method according to claim 1, wherein a solvent of the mixture solution is a tetrafluoropropanol (TFP).

4. A method according to claim 1, wherein the solution only containing the aggregated portion of the dye material is prepared by applying an energy to the solution only containing the non-aggregated portion, whereby molecules in said non-aggregated portion aggregate to form the solution only containing the aggregated portion of the dye material.

5. A method according to claim 4, wherein the energy applied to the solution only containing the non-aggregated portion is a heat energy.

6. A method according to claim 4, wherein the energy applied to the solution only containing the non-aggregated portion is an optical energy.

7. An optical recording medium comprising:
   a light transmission substrate; and
   a recording film formed on the light transmission substrate,
   said recording film being prepared by coating a mixture solution, which is prepared by mixing a solution containing only a non-aggregated portion of a dye material and a solution containing only an aggregated portion of a dye material, with a predetermined mixing ratio, on a surface of the light transmission substrate so as to provide a predetermined reflectance.

* * * * *